United States Patent
E Silva et al.

(10) Patent No.: US 12,206,306 B2
(45) Date of Patent: Jan. 21, 2025

(54) ELECTRICAL MACHINE, IN PARTICULAR FOR A VEHICLE WITH A COOLING CHANNEL FOR COOLING STATOR WINDINGS

(71) Applicant: Mahle International GmbH, Stuttgart (DE)

(72) Inventors: Roberto Almeida E Silva, Stuttgart (DE); Bernd Blankenbach, Boeblingen (DE); Terry Cox, Swinford (GB); Philip Grabherr, Stuttgart (DE); Niklas Kull, Stuttgart (DE); Tim Male, Telford (GB); Peter Pisek, Leitring (AT); Peter Sever, Murska Sobota (SI); Josef Sonntag, Nuertingen (DE); Martin Williams, Northkampton (GB)

(73) Assignee: MAHLE INTERNATIONAL GMBH (DE)

( * ) Notice: Subject to any disclaimer, the term of this patent is extended or adjusted under 35 U.S.C. 154(b) by 700 days.

(21) Appl. No.: 16/686,206

(22) Filed: Nov. 17, 2019

(65) Prior Publication Data

US 2020/0161916 A1   May 21, 2020

(30) Foreign Application Priority Data

Nov. 19, 2018  (DE) .......................... 102018219817.9

(51) Int. Cl.
| | |
|---|---|
| *H02K 3/24* | (2006.01) |
| *H02K 9/197* | (2006.01) |
| *H02K 9/22* | (2006.01) |

(52) U.S. Cl.
CPC .............. *H02K 3/24* (2013.01); *H02K 9/197* (2013.01); *H02K 9/227* (2021.01)

(58) Field of Classification Search
CPC ........................................................ H02K 3/24
See application file for complete search history.

(56) References Cited

U.S. PATENT DOCUMENTS

| | | | |
|---|---|---|---|
| 3,405,297 A | 10/1968 | Madsen | |
| 3,624,432 A * | 11/1971 | Merz | ......................... H02K 3/48 |
| | | | 310/66 |

(Continued)

FOREIGN PATENT DOCUMENTS

| | | |
|---|---|---|
| BE | 673209 A | 4/1966 |
| CN | 105186783 A | 12/2015 |

(Continued)

OTHER PUBLICATIONS

Guyot (EP 392243 A) English Translation (Year: 1990).*

(Continued)

*Primary Examiner* — Tulsidas C Patel
*Assistant Examiner* — Robert E Mates
(74) *Attorney, Agent, or Firm* — Fishman Stewart PLLC (57) ABSTRACT

An electrical machine may include a rotor rotatable about an axis of rotation, by way of which an axial direction of the electrical machine may be defined, a stator having electrically conductive stator windings, and at least one cooling channel through which a coolant may be flowable for cooling the stator windings. The stator may have stator teeth extending along the axial direction, arranged spaced apart from another along a circumferential direction of the rotor, and bearing the stator windings. The at least one cooling channel and at least one stator winding may be arranged in at least one intermediate space formed between two stator teeth adjacent in the circumferential direction. A plastic for transferring heat from the at least one stator winding to the at least one cooling channel may be arranged in the at least one intermediate space.

26 Claims, 4 Drawing Sheets

(56) References Cited

U.S. PATENT DOCUMENTS

| | | | |
|---|---|---|---|
| 4,160,926 A * | 7/1979 | Cope | H02K 3/38 |
| | | | 428/95 |
| 6,084,621 A | 7/2000 | Shioya | |
| 6,170,974 B1 * | 1/2001 | Hyypio | H02K 3/28 |
| | | | 310/179 |
| 10,291,106 B2 | 5/2019 | Takahashi | |
| 11,190,064 B2 * | 11/2021 | Hoerz | H02K 3/30 |
| 2006/0163954 A1 * | 7/2006 | Biais | H02K 3/493 |
| | | | 310/54 |
| 2008/0042489 A1 | 2/2008 | Lewis et al. | |
| 2009/0022610 A1 | 1/2009 | Materne et al. | |
| 2009/0230806 A1 * | 9/2009 | Miyata | H02K 19/12 |
| | | | 310/195 |
| 2012/0228969 A1 * | 9/2012 | Kimiabeigi | H02K 3/24 |
| | | | 310/59 |
| 2013/0209239 A1 * | 8/2013 | Karlsson | H02K 5/20 |
| | | | 415/117 |
| 2013/0285488 A1 * | 10/2013 | Kazmin | H02K 3/24 |
| | | | 310/65 |
| 2014/0125188 A1 * | 5/2014 | Marvin | H02K 15/045 |
| | | | 310/216.058 |
| 2014/0292118 A1 * | 10/2014 | Takahashi | H02K 3/24 |
| | | | 29/596 |
| 2015/0372565 A1 | 12/2015 | Airoldi | |
| 2015/0377358 A1 * | 12/2015 | Groette | E21B 43/121 |
| | | | 415/176 |
| 2016/0111933 A1 | 4/2016 | Takimoto | |
| 2017/0037858 A1 | 2/2017 | Back et al. | |
| 2017/0063200 A1 * | 3/2017 | Tremelling | H02K 3/24 |
| 2017/0138914 A1 * | 5/2017 | Zhang | G01N 30/7206 |
| 2017/0241680 A1 * | 8/2017 | Lange | H02K 3/44 |
| 2018/0163728 A1 * | 6/2018 | Zugelder | H01R 13/5208 |
| 2018/0187029 A1 * | 7/2018 | Sperindio | B05D 5/083 |
| 2019/0109513 A1 * | 4/2019 | Bethge | H02K 9/197 |
| 2022/0014062 A1 * | 1/2022 | Almeida E Silva | H02K 9/227 |

FOREIGN PATENT DOCUMENTS

| | | | | |
|---|---|---|---|---|
| CN | 105896765 A | | 8/2016 | |
| DE | 102006008423 A1 | | 8/2007 | |
| DE | 102014205034 A1 | | 9/2015 | |
| DE | 102015214788 A1 | | 2/2017 | |
| DE | 102017221803 A1 | | 6/2019 | |
| EP | 392243 A | * | 10/1990 | H02K 3/24 |
| EP | 0414927 A1 | | 3/1991 | |
| EP | 1237254 A1 | | 9/2002 | |
| EP | 3223394 A1 | * | 9/2017 | H02K 3/24 |
| GB | 720295 A | * | 12/1954 | |
| GB | 9725316 | | 1/1998 | |
| JP | H09254415 A | | 9/1997 | |
| JP | H1198743 A | | 4/1999 | |
| JP | 2014197962 A | | 10/2014 | |
| JP | 2017192201 A | | 10/2017 | |

OTHER PUBLICATIONS

English abstract for DE-102017221803.
English abstract for EP-0414927.
Japanese Notice of Reasons for Refusal dated Oct. 2, 2023 for Japanese Patent Application No. 2019-207204.
Chinese First Office Action dated Feb. 1, 2024 and Chinese Search Report dated Jan. 30, 2024 for Chinese Patent Application No. 201911135472 7.

* cited by examiner

ELECTRICAL MACHINE, IN PARTICULAR FOR A VEHICLE WITH A COOLING CHANNEL FOR COOLING STATOR WINDINGS

CROSS-REFERENCE TO RELATED APPLICATIONS

This application claims priority to German Patent Application No. DE 10 2018 219 817.9, filed on Nov. 19, 2018, the contents of which are hereby incorporated by reference in their entirety.

TECHNICAL FIELD

The invention relates to an electrical machine, in particular for a vehicle, and to a vehicle having such a machine.

BACKGROUND

Such an electrical machine may generally be an electric motor or a generator. The electrical machine may be designed as an external rotor or as an internal rotor.

A generic machine is known for example from U.S. Pat. No. 5,214,325. It comprises a housing that surrounds an inner space and that has a casing running around in a circumferential direction of the housing and radially delimiting the inner space, a rear side wall axially delimiting the inner space axially on one side and a front side wall axially delimiting the inner space axially on the other side. A stator of the machine is fixedly connected to the casing. A rotor of the machine is arranged in the stator, wherein a rotor shaft of the rotor is mounted so as to be able to rotate on the front side wall by way of a front shaft bearing.

The stator of a conventional electrical machine typically comprises stator windings that are electrically energized during operation of the machine. Heat arises in the process, this heat having to be dissipated in order to avoid overheating and associated damage to or even destruction of the stator. For this purpose, it is known from conventional electrical machines to equip these with a cooling device in order to cool the stator—in particular said stator windings. Such a cooling device comprises one or more cooling channels that are flowed through by a coolant and are arranged in the vicinity of the stator windings in the stator. Heat is able to be dissipated from the stator by virtue of a transfer of heat from the stator windings to the coolant.

It proves to be a disadvantage in this case that an efficient transfer of heat from the stator to the coolant flowing through the respective cooling channel is possible only with considerable structural expenditure. This however has a disadvantageous effect on the manufacturing costs of the electrical machine.

SUMMARY

One object of the present invention is therefore to provide an improved embodiment for an electrical machine in which this disadvantage is largely or even completely eliminated. The intention is in particular to provide an improved embodiment for an electrical machine that is distinguished by improved cooling of the stator windings of the stator.

This object is achieved by the subject matter of the independent patent claims. Preferred embodiments are the subject matter of the dependent patent claims.

The basic idea of the invention is accordingly to embed the stator windings of an electrical machine together with a cooling channel, able to be flowed through by coolant, for cooling the stator windings into a plastic that typically intrinsically combines electrically insulating and thermally conductive properties. The plastic is thus able to act as a heat transferring medium for transferring heat from the stator windings to the coolant flowing through the cooling channel, on the one hand, and as an electrical insulator for the stator windings, on the other hand. A particularly good transfer of heat between the stator windings and the coolant guided through the cooling channel is in particular thereby produced. This is in particular the case when a plastic that has a high thermal conductivity is used. By using a plastic having electrically insulating properties, it is additionally ensured that the stator windings to be cooled are not undesirably electrically short-circuited, by way of the electrical plastic, with the coolant guided through the cooling channel. It is furthermore ensured that the coolant—which is typically electrically conductive—is electrically insulated from the stator windings when it flows through the cooling channel. Furthermore, the stator teeth, as part of the stator, are also able to be electrically insulated from the stator windings by way of the plastic.

The direct thermal coupling of the cooling channel containing the coolant to the stator windings to be cooled using the plastic that is essential to the invention leads to particularly effective cooling of the stator windings in comparison with conventional cooling devices. Thus, even in the event of a significant development of waste heat in the stator, as occurs for example during high-load operation of the electrical machine, it is able to be ensured that the waste heat that arises is able to be dissipated from the stator. Damage to or even destruction of the electrical machine caused by overheating of the stator is thus able to be avoided.

An electrical machine according to the invention, in particular for a vehicle, comprises a rotor that is able to rotate about an axis of rotation, by way of which an axial direction of the electrical machine is defined. The machine furthermore comprises a stator that has electrically conductive stator windings, and at least one cooling channel, able to be flowed through by a coolant, for cooling the stator windings. The stator has stator teeth that extend along the axial direction, are arranged spaced apart from one another along a circumferential direction of the rotor and bear the stator windings. At least one cooling channel and at least one stator winding are arranged in at least one intermediate space that is formed between two stator teeth that are adjacent in the circumferential direction. According to the invention, a plastic for transferring heat from the stator winding to the cooling channel is arranged in the intermediate space.

The plastic is thus preferably designed to be thermally conductive. The plastic may expediently also be designed to be electrically insulating, that is to say consist of an electrically insulating plastic material.

According to one preferred embodiment, the plastic is arranged at least partly on the surface sections of the two adjacent stator teeth delimiting the intermediate space. The cooling channel and the stator winding are preferably each electrically insulated from the stator teeth by way of the plastic and thermally conductively connected to one another.

According to another further preferred embodiment, the stator comprises a stator body from which the stator teeth protrude radially inwardly. In this embodiment, which may in particular be combined with the embodiment explained above, the plastic is arranged on a surface section of the stator body that radially outwardly delimits the intermediate space.

The plastic is in this case particularly preferably arranged on all surface sections, delimiting an intermediate space, of the two stator teeth, that is to say both on the circumferential and on the radial delimitation of the intermediate space in question. A situation whereby an undesired electrical connection is able to arise between the electrically conductive material of the stator windings and the stator teeth, which are likewise electrically conductive, is thereby able to be ruled out.

According to one advantageous development, the plastic arranged on the surface sections forms an electrically insulating layer that covers the surface sections of the two adjacent stator teeth delimiting the intermediate space. Such an insulating layer made from plastic is able to be manufactured particularly easily, for example by way of an injection moulding method.

The cooling channel is expediently arranged in the region of a radially inner end section of the intermediate space. A particularly large amount of installation space for arranging the stator winding(s) in the intermediate space is thereby available. As an alternative or in addition, it is conceivable to arrange a cooling channel in the region of a radially outer end section of the intermediate space.

In a further preferred embodiment, the plastic forms at least one phase insulation arranged in the intermediate space and that divides the intermediate space into a radially inner and into a radially outer subspace. Conductor elements of the stator winding that are electrically insulated from one another are thereby able to be arranged in both subspaces. This in turn makes it possible to assign two different electrical phases to the two conductor elements that are electrically insulated from one another, these phases having to be electrically separate from one another. In one development of the invention, it is also conceivable for a plurality of such phase insulations to be provided in an intermediate space. A diameter of the phase insulation made from the plastic as measured in the radial direction is expediently between 1 mm and 3 mm.

The phase insulation may expediently extend along the circumferential direction and thus connect the two insulating layers made from the plastic and arranged on the adjacent stator teeth to one another. The two subspaces that are formed are thereby completely delimited by the preferably electrically insulating plastic.

According to one advantageous development, the at least one stator winding arranged in the intermediate space comprises at least one first conductor element and at least one second conductor element. According to this development, these two conductor elements are arranged at a distance from one another in the intermediate space, specifically preferably along the radial direction. The first conductor element may be part of a first electrical phase, and the second conductor element may accordingly be part of a second electrical phase of the stator. Expediently, the first conductor elements are arranged in the radially inner subspace and electrically connected to one another in order to connect to a common first phase of an electric current source. In this development, the second conductor elements are arranged in the radially outer subspace and electrically connected to one another in order to connect to a common second phase of the electric current source.

At least one first and, as an alternative or in addition, one second conductor element is expediently surrounded by the electrically insulating and thermally conductive plastic that is essential to the invention in the cross section perpendicular to the axial direction. This is preferably the case for all of the first and, as an alternative or in addition, for all of the second conductor elements.

The first and, as an alternative or in addition, the second conductor elements may particularly expediently be formed as winding rods made from an electrically conductive material.

According to one advantageous development, at least one winding rod may have a rectangular geometry with two narrow sides and with two wide sides in the cross section perpendicular to the axial direction. This is preferably the case for all of the winding rods of the stator winding.

According to one particularly preferred embodiment, the at least one first conductor element is electrically insulated from the at least one second conductor element by way of the plastic. The first conductor elements are particularly preferably electrically insulated from the second conductor elements by way of the phase insulation that separates the radially inner subspace from the radially outer subspace.

In a further preferred embodiment, the plastic forms a protective coating arranged in the intermediate space and that at least partly, preferably fully, delimits or surrounds the cooling channel in the cross section perpendicular to the axial direction. "Delimitation" is understood to mean in particular that the cooling channel does not require any further delimitation, for example in the form of a tubular body. "Protective coating" is understood to mean in particular that additional delimitation, for instance in the form of said tubular body, may be provided for the cooling channel. The protective coating is able to prevent a situation whereby the coolant guided through the cooling channel, which coolant is typically electrically conductive, is able to come into contact with the stator winding that is likewise arranged in the intermediate space or the electrically conductive stator teeth, resulting in an electrical short circuit.

According to one advantageous development, the protective coating delimits the cooling channel radially inwardly and, as an alternative or in addition, radially outwardly in the cross section perpendicular to the axial direction. Electrical insulation of the cooling channel or of the coolant guided through the cooling channel from the stator windings arranged radially outside or radially inside the cooling channel in the intermediate space is thereby created.

According to a further advantageous development that is able to be combined with the development explained above, the protective coating delimits the cooling channel in the circumferential direction in the cross section perpendicular to the axial direction. The electrical insulation of the cooling channel or of the coolant guided through the cooling channel from the electrically conductive stator teeth is thereby ensured.

A further cooling channel may particularly expediently be arranged in particular in the region of a radially outer end section of the intermediate space. The cooling of the stator winding(s) is thereby able to be significantly improved.

In another preferred embodiment, the plastic forms a further protective coating arranged in the intermediate space and that at least partly, preferably fully, delimits or surrounds the further cooling channel.

According to a further advantageous development, the further protective coating delimits the further cooling channel radially inwardly and, as an alternative or in addition, radially outwardly in the cross section perpendicular to the axial direction. Electrical insulation of the further cooling channel or of the coolant guided through the further cooling channel from the stator windings arranged radially outside or radially inside the further cooling channel in the intermediate space is ensured by way of the further protective coating.

According to a further advantageous development that is able to be combined with the development explained above, the further protective coating delimits the further cooling channel in the circumferential direction in the cross section perpendicular to the axial direction. The electrical insulation of the further cooling channel or of the coolant guided through the further cooling channel from the electrically conductive stator teeth is thereby ensured.

The cooling channel arranged in the region of the radially inner end section is expediently arranged in the radially inner subspace formed by way of the phase insulation made from plastic. As an alternative or in addition, the cooling channel arranged in the region of the radially outer end section is arranged in the radially outer subspace formed by way of the phase insulation made from plastic. Conductor elements of the stator winding(s) that are arranged both radially inwardly and radially outwardly in the intermediate space are thereby able to be cooled highly effectively by the transfer of heat to the coolant guided through the respective cooling channel.

According to another preferred embodiment, a gap is formed at least partly between at least two conductor elements and, as an alternative or in addition, between at least one conductor element and the electrical insulating layer arranged on the surface sections of the stator teeth or of the stator body. In this embodiment, the plastic that is essential to the invention forms a gap filler by way of which the gap is at least partly, preferably completely, filled.

According to another preferred embodiment, the plastic may comprise an electrically insulating plastic mass into which the stator winding is embedded.

The intermediate space may expediently have a trapezoidal geometry, preferably a rectangular geometry, in the cross section perpendicular to the axial direction. The trapezoidal or rectangular geometry makes it possible to place both at least one cooling channel and a large number of conductor elements or stator windings in the respective intermediate space.

According to one preferred embodiment, the plastic provided on the surface sections of the stator teeth is formed by an electrically insulating first plastic material. As an alternative or in addition, in this embodiment, the plastic forming the at least one phase insulation is formed by a second plastic material. The plastic forming the first and, as an alternative or in addition, the plastic forming the further protective coating may furthermore be formed by the second plastic material or, as an alternative thereto, by a third plastic material.

According to one advantageous development, the first and, as an alternative or in addition, the second and, as an alternative or in addition, the third plastic material are identical materials. In one alternative development thereto, the first and, as an alternative or in addition, the second and, as an alternative or in addition, the third plastic material may be different materials.

The first and, as an alternative or in addition, the second and, as an alternative or in addition, the third plastic material may expediently consist of a thermoplastic or comprise such a thermoplastic. The first and, as an alternative or in addition, the second and, as an alternative or in addition, the third plastic material may likewise expediently consist of a thermoset or comprise a thermoset.

The first and, as an alternative or in addition, the second and, as an alternative or in addition, the third plastic material expediently have identical thermal conductivities. As an alternative or in addition, the first and, as an alternative or in addition, the second and, as an alternative or in addition, the third plastic material may have different thermal conductivities.

The first and, as an alternative or in addition, the second and, as an alternative or in addition, the third plastic material may expediently be identical materials. The first and, as an alternative or in addition, the second and, as an alternative or in addition, the third plastic material may likewise also however be different materials.

According to one particularly preferred embodiment, the at least one stator winding is part of a distributed winding.

According to one preferred embodiment, the thermal conductivity of the plastic, in particular of the first and, as an alternative or in addition, of the second and, as an alternative or in addition, of the third plastic material is at least 0.5 W/mK, preferably at least 1 W/mK.

In one further preferred embodiment, the intermediate space is formed substantially without a gap by way of the plastic.

In one embodiment that is particularly easy to implement, only a single cooling channel, that is to say no second cooling channel, is provided in the intermediate space.

According to one advantageous development, the machine comprises a coolant distribution space and a coolant collection space arranged axially at a distance from said coolant distribution space. In this case, the coolant distribution space communicates fluidically with the coolant collection space by way of the at least one cooling channel able to be flowed through by a coolant. A plurality of such cooling channels are preferably provided between the coolant distribution space and the coolant collection space.

According to one preferred embodiment, the coolant distribution space and, as an alternative or in addition, the coolant collection space are arranged at least partly in the plastic that is essential to the invention in order to be thermally coupled to the stator windings, which plastic in this case consists of an electrically insulating plastic material. This allows a particularly good transfer of heat between the coolant distribution space or coolant collection space and the stator windings, such that the coolant distribution space or the coolant collection space is also able to be used to directly absorb heat from the stator windings.

The electrically insulating plastic particularly preferably at least partly delimits the coolant distribution space and, as an alternative or in addition, the coolant collection space in order to be thermally coupled to the stator windings.

The invention furthermore relates to a vehicle, in particular to a motor vehicle having an electrical machine presented above. The abovementioned advantages of the electrical machine therefore also apply to the vehicle according to the invention.

Further important features and advantages of the invention will emerge from the dependent claims, from the drawings and from the associated description of the figures with reference to the drawings.

It goes without saying that the features mentioned above and those still to be explained below may be used not only in the respectively specified combination but also in other combinations or on their own without departing from the scope of the present invention.

Preferred exemplary embodiments of the invention are illustrated in the drawings and are explained in more detail in the following description.

DETAILED DESCRIPTION

Figure 1:
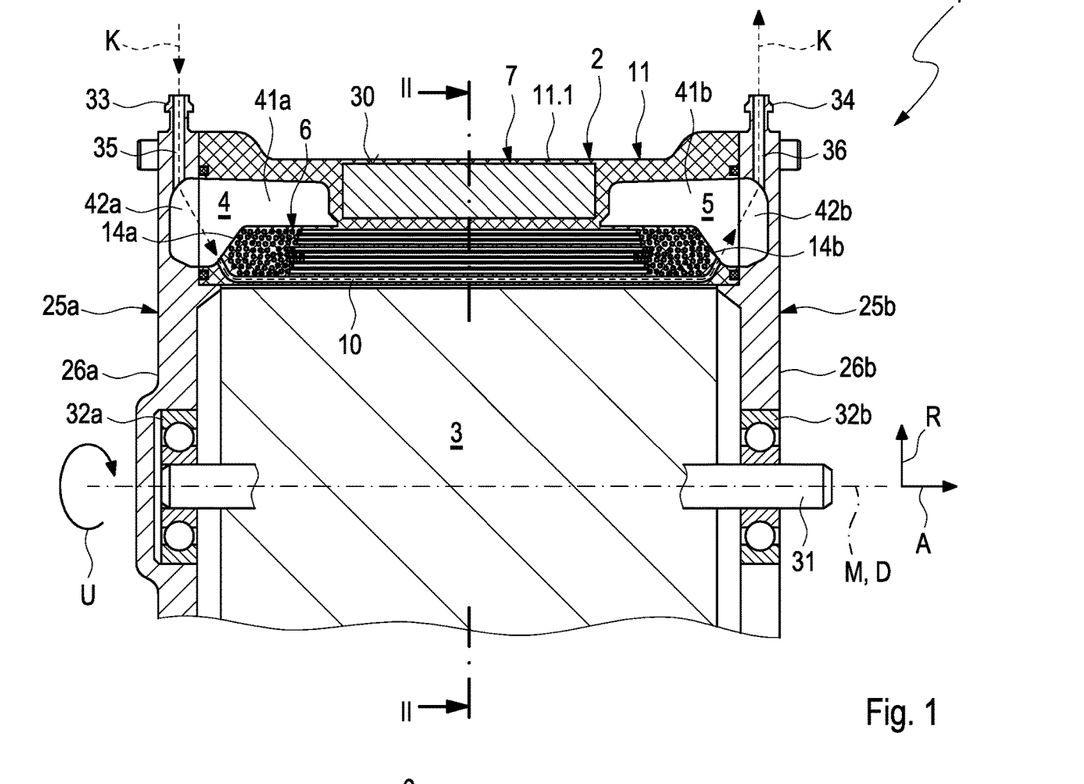
FIG. 1 shows an example of an electrical machine according to the invention in a longitudinal section along the axis of rotation of the rotor.

FIG. 1 illustrates an example of an electrical machine 1 according to the invention in a sectional illustration. The electrical machine 1 is dimensioned such that it is able to be used in a vehicle, preferably in a road vehicle.

The electrical machine 1 comprises a rotor 3, illustrated only very schematically in FIG. 1, and a stator 2. For clarification, the stator 2 is illustrated in a separate illustration in FIG. 2 in a cross section perpendicular to the axis of rotation D along the cutting line II-II of FIG. 1. According to FIG. 1, the rotor 3 has a rotor shaft 31 and may have a plurality of magnets that are not illustrated in more detail in FIG. 1 and the magnetic polarizations of which may alternate along the circumferential direction U. The rotor 3 is able to rotate about an axis of rotation D, the position of which is defined by the central longitudinal axis M of the rotor shaft 31. The axis of rotation D defines an axial direction A that extends parallel to the axis of rotation D. A radial direction R runs perpendicular to the axial direction A. A circumferential direction U rotates about the axis of rotation D.

As is able to be seen in FIG. 1, the rotor 3 is arranged in the stator 2. The electrical machine 1 shown here is thus what is known as an internal rotor. An implementation as what is known as an external rotor, in which the rotor 3 is arranged outside the stator 2, is however also conceivable. The rotor shaft 31 is mounted so as to be able to rotate on the stator 2 about the axis of rotation D in a first shaft bearing 32a and, spaced axially therefrom, in a second shaft bearing 32b.

The stator 2 furthermore comprises, as is known, a plurality of stator windings 6 that are able to be electrically energized in order to generate a magnetic field. The rotor 3 is set in rotation by virtue of magnetic interaction of the magnetic field generated by the magnets of the rotor 3 with the magnetic field generated by the electrically conductive stator windings 6.

Figure 2:
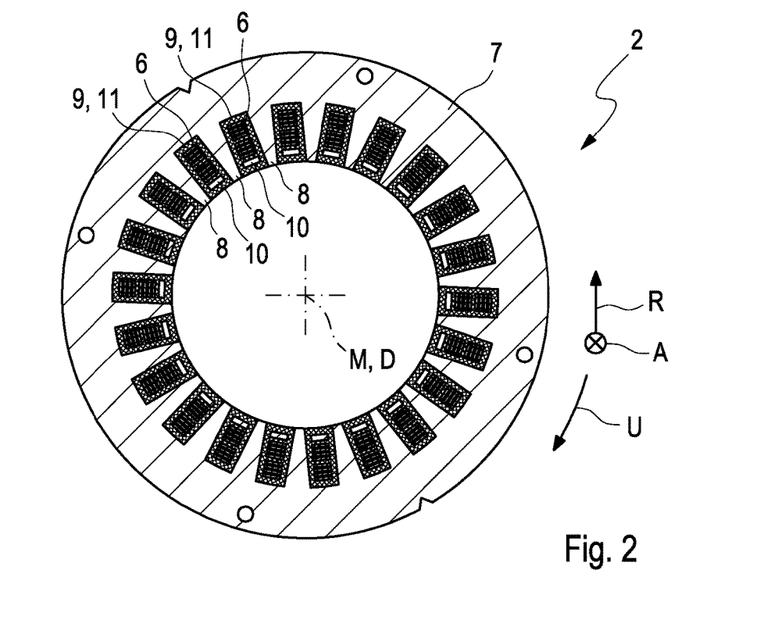
FIG. 2 shows the stator of the electrical machine according to FIG. 1 in a cross section perpendicular to the axis of rotation of the rotor.

It is able to be seen from the cross section of FIG. 2 that the stator 2 may have an annular stator body 7, for example made from iron. The stator body 7 may in particular be formed from a plurality of stator body plates (not shown) that are stacked on top of one another along the axial direction A and adhesively bonded to one another. A plurality of stator teeth 8 are formed radially inwardly on the stator body 7, which stator teeth extend along the axial direction A, protrude radially inwardly away from the stator body 7 and are arranged spaced apart from one another along the circumferential direction U. Each stator tooth 8 bears a stator winding 6. The individual stator windings 6 together form a winding arrangement. Depending on the number of magnetic poles to be formed by the stator windings 6, the individual stator windings 6 of the overall winding arrangement may be appropriately electrically wired to one another.

During operation of the machine 1, the electrically energized stator windings 6 generate waste heat that needs to be dissipated from the machine 1 in order to prevent overheating and accompanying damage to or even destruction of the machine 1. The stator windings 6 are therefore cooled by way of a coolant K that is guided through the stator 2 and that absorbs the waste heat generated by the stator windings 6 by way of a transfer of heat.

In order to guide the coolant K through the stator 2, the machine 1 comprises a coolant distribution space 4 into which a coolant K is able to be introduced via a coolant inlet 33. A coolant collection space 5 is arranged at a distance from the coolant distribution space 4 along the axial direction A. The coolant distribution space 4 communicates fluidically with the coolant collection space 5 by way of a plurality of cooling channels 10, only one of which is visible in the illustration of FIG. 1. The coolant distribution space 4 and the coolant collection space 5 may each have an annular geometry in a cross section, not shown in the figures, perpendicular to the axial direction A. A plurality of cooling channels 10 are arranged spaced apart from one another along the circumferential direction U, each of which cooling channels extends along the axial direction A from the annular coolant distribution space 4 to the annular coolant collection space 5. The coolant K introduced into the coolant distribution space 4 via the coolant inlet 33 is thus able to be distributed to the individual cooling channels 10. After flowing through the cooling channels 10 and absorbing heat from the stator windings 6, the coolant K is collected in the coolant collection space 5 and guided out of the machine 1 again via a coolant outlet 34 provided on the stator 2.

As is able to be seen in the illustrations of FIGS. 1 and 2, the stator windings 6 and the cooling channels 10 are arranged in intermediate spaces 9 that are formed between in each case two stator teeth 8 that are adjacent in the circumferential direction U. Said intermediate spaces 9 are also known to a relevant person skilled in the art as what are called "stator grooves" or "stator slots", these extending, just like the stator teeth 8, along the axial direction A.

Figure 3:
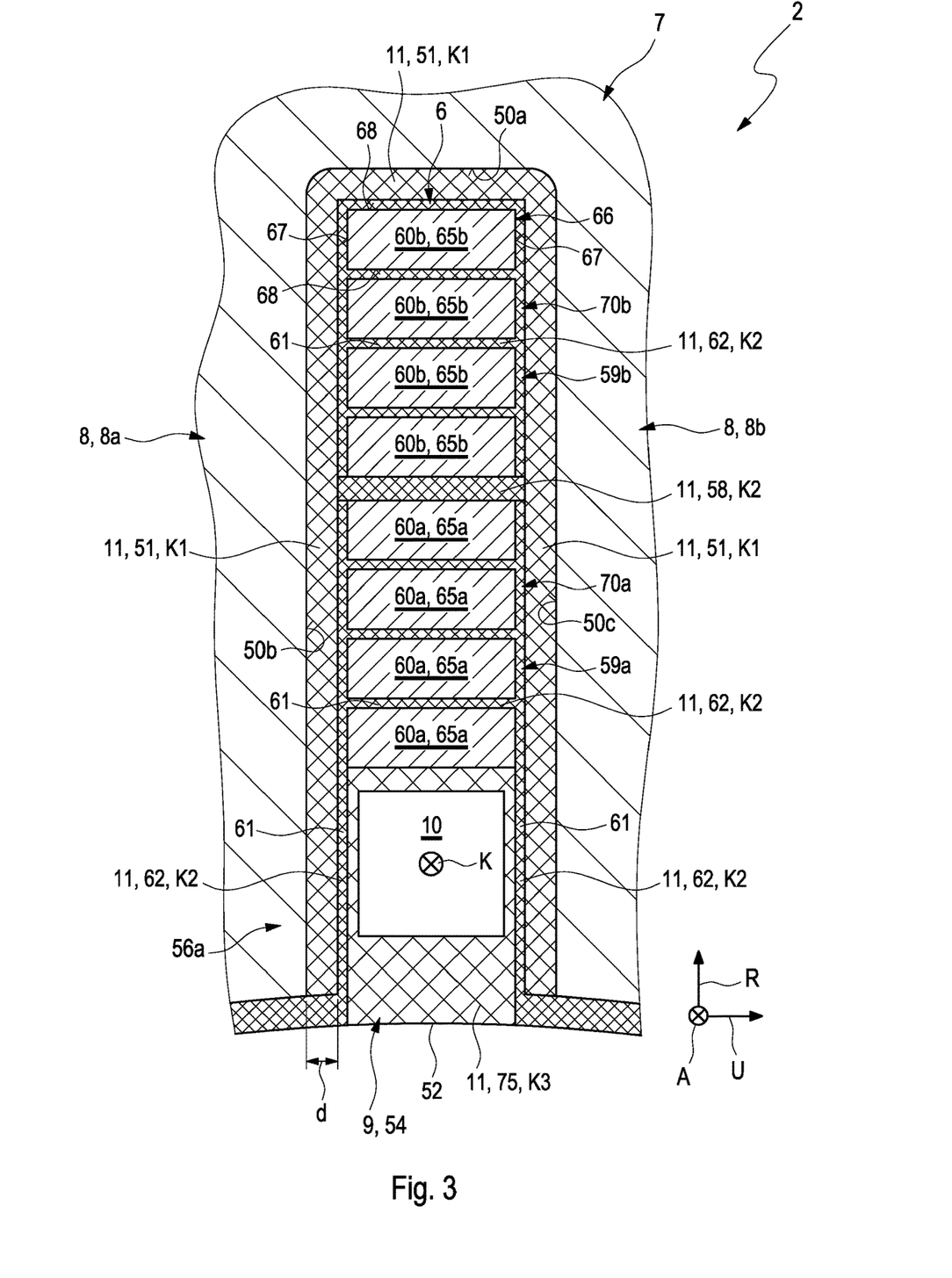
FIG. 3 shows a detailed illustration of the stator of FIG. 2 in the region of an intermediate space between two stator teeth that are adjacent in the circumferential direction.

The illustration of FIG. 3 is explained below, this showing a detailed illustration of an intermediate space 9 formed between two stator teeth 8 that are adjacent in the circumferential direction U—also referred to below as stator teeth 8a, 8b.

As FIG. 3 shows, the intermediate space 9 radially inwardly has an opening 52, and is thus, radially inwardly, formed so as to be open. The intermediate space 9 may have a trapezoidal geometry, in particular a rectangular geometry, in the cross section perpendicular to the axial direction A. In the example of FIG. 3, the cooling channel 10 is arranged in the region of a radially inner end section 56a of the intermediate space 9 or of the stator groove 54, that is to say in the region of the opening 52.

In order to improve the transfer of heat of the waste heat generated by the stator windings 6 to the coolant K flowing through the cooling channels 10, according to FIG. 3, a thermally conductive plastic 11 is additionally arranged in the intermediate spaces 9 alongside a cooling channel 10 and a stator winding 6. This plastic 11 is preferably introduced into the intermediate space 9 by way of injection moulding.

As is able to be seen in FIG. 3, the plastic 11 is arranged on surface sections 50b, 50c of two stator teeth 8 that are adjacent in the circumferential direction U and that delimit the intermediate space 9. The plastic 11 is furthermore arranged on a surface section 50a of the stator body 7 that radially outwardly delimits the intermediate space 9.

The plastic 11 arranged on the surface sections 50a, 50b, 50c is expediently an electrically insulating plastic. It is thus ensured that both the cooling channel 10 arranged in the intermediate space 9 and the stator winding 6 arranged in the same intermediate space 9 are each electrically insulated from the stator teeth 8 by way of the plastic 11. The stator winding 6 is furthermore thermally conductively connected to the cooling channel 10 by way of the plastic 11, such that waste heat generated in or by the stator winding 6 is able to be transferred, via the plastic 11, to the coolant K flowing through the cooling channel 10 and thus dissipated by the stator winding 6.

The plastic 11 arranged on the three surface sections 50a, 50b, 50c forms an electrically insulating and thermally conductive insulating layer 51 that covers the surface sections 50a, 50b, 50c. By way of example, a layer thickness d of the insulating layer may be 0.2 mm to 0.5 mm.

According to FIG. 3, the plastic 11 may form not only the insulating layer 51 but also—as an alternative or in addition thereto—a phase insulation 58 arranged in the intermediate space 9 or in the stator groove 54. The phase insulation 58 divides the intermediate space 9 into a radially inner and into a radially outer subspace 59a, 59b. First conductor elements 60a of the stator winding 6 that form a first phase winding 70a may thus be arranged in the radially inner subspace 59a. Second conductor elements 60b of the stator winding 6 that form a second phase winding 70b that is electrically insulated from the first phase winding 70a may likewise be arranged in the radially outer subspace 59b.

The phase insulation 58 expediently extends along the circumferential direction U. The phase insulation 58 preferably connects the two insulating layers 51 made from the plastic 11 and arranged on the adjacent stator teeth 8a, 8b to one another.

It is seen that the plastic 11 forms not only the electrical insulating layer 51 but also a first protective coating 75 arranged in the intermediate space 9 and that delimits or surrounds the cooling channel 10. It is thus not necessary to provide a tubular body or the like in order to delimit the cooling channel 10 in a fluidtight manner such that no coolant K is able to exit therefrom.

In the exemplary scenario in FIG. 3, the first protective coating 75 closes off the opening 52 of the intermediate space 9 formed so as to be open or of the stator groove 54.

As is also able to be seen in FIG. 3, the stator winding 6 is also not only electrically insulated from the cooling channel 10 by way of the plastic 11 forming the first protective coating 75, but is rather also thermally conductively connected thereto, such that waste heat generated in or by the stator winding 6 is also able to be transferred, via the first protective coating 75, to the coolant K flowing through the cooling channel 10.

The first conductor elements 60a are arranged in the radially inner subspace 59a and the second conductor elements 60b are arranged in the radially outer subspace 59b.

The cooling channel 10 arranged in the region of the radially inner end section 54a is arranged in the radially inner subspace 59a formed by way of the phase insulation 58 made from plastic 11.

As is able to be seen in FIG. 3, the stator winding 6 arranged in the intermediate space 9 comprises first conductor elements 60a and second conductor elements 60b that are arranged next to one another and spaced apart from one another in the intermediate space 9 along the radial direction R. A gap 61, which may preferably extend along the circumferential direction U, is formed between in each case two conductor elements 60a, 60b that are adjacent along the radial direction R. In this case, the plastic 11 forms a gap filler 62 by way of which the gap 61 is completely filled.

Similarly, a gap 61 may be formed between the first and second conductor elements 60a, 60b and the electrical insulation arranged on the surface sections 50b, 50c of the stator teeth 8a, 8b. In this case as well, the plastic 11 forms a gap filler 62 by way of which the gap 61 is filled. It is understood that said gap 61 filled with the plastic 11 may also extend only in sections or may be present in the form of what is known as an air pocket. It is also conceivable for a plurality of gaps 61 or air pockets that are filled with the gap filler 62 made from the plastic 11 to be present. All of the first and second conductor elements 60a, 60b are thus surrounded by the electrically insulating and thermally conductive plastic 11 perpendicular to the axial direction A in the cross section illustrated in FIG. 3.

The first and second conductor elements 60a, 60b are each formed as first and second winding rods 65a, 65b made from an electrically conductive and mechanically rigid material. The first and second winding rods 65a, 65b each have a rectangular geometry 66 with two narrow sides 67 and two wide sides 68 in the cross section perpendicular to the axial direction A.

According to FIG. 3, the first conductor elements 60a are arranged in the radially inner subspace 59a and electrically connected to one another in order to connect to a common first phase of an electric current source. Accordingly, the second conductor elements 60b are arranged in the radially outer subspace 59b and electrically connected to one another in order to connect to a common second phase of the electric current source. The first conductor elements 60a are furthermore electrically insulated from the second conductor elements 60b by way of the phase insulation 58.

Figure 4:
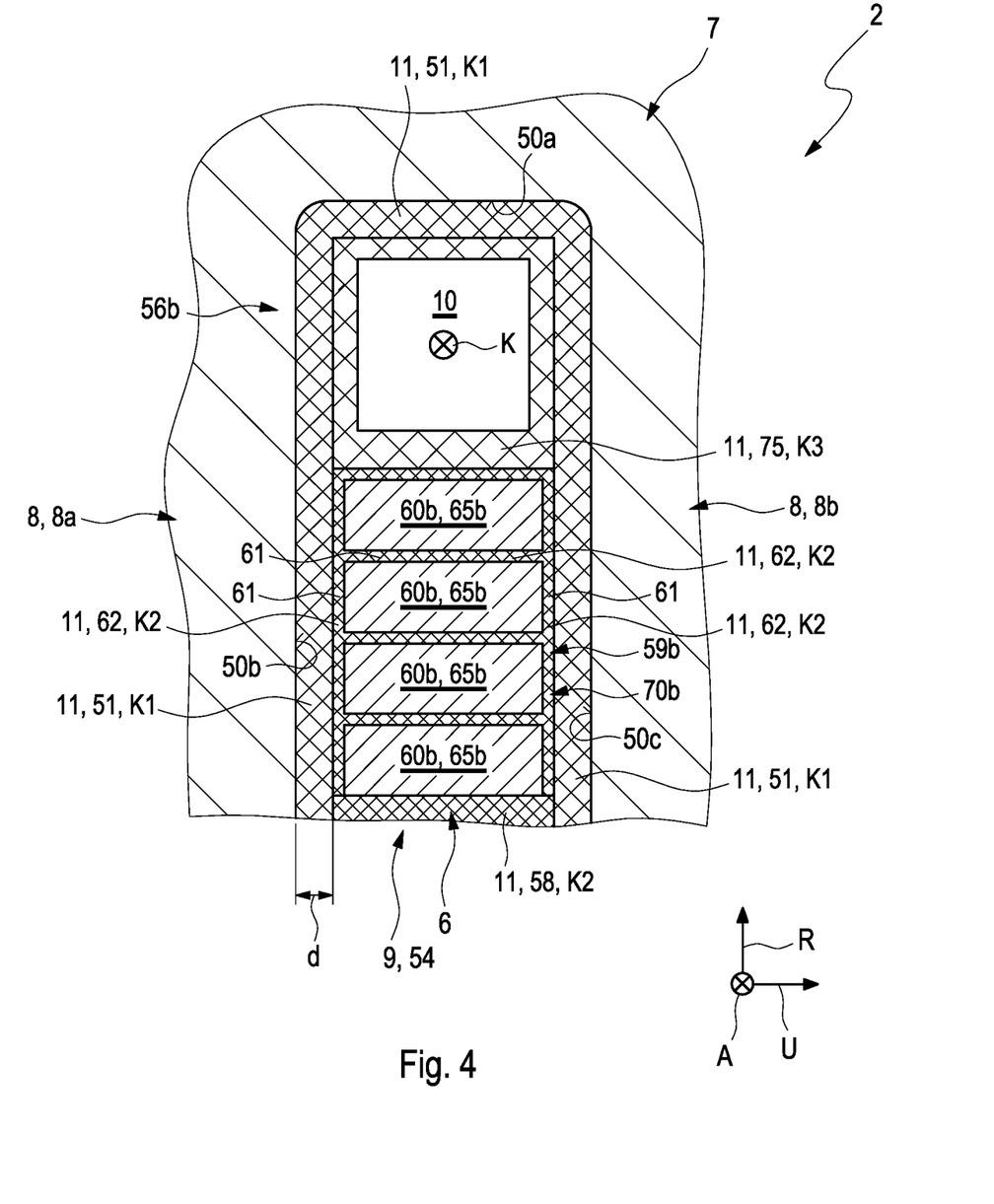
FIG. 4 shows a development of the example according to FIG. 3 with an additional, second cooling channel.

FIG. 4 shows a development of the example of FIG. 3. The example of FIG. 4 differs from that of FIG. 3 in that an additional cooling channel 10 is arranged in the region of a radially outer end section 56b of the intermediate space 9 or of the stator groove 54 that lies opposite the radially inner end section 56a with respect to the radial direction.

In the example of FIG. 4, the plastic 11—in a manner similar to the first protective coating 75 of the cooling channel 10—forms a second protective coating 75 arranged in the intermediate space 9 and that delimits and thus surrounds the additional cooling channel 10. As is able to be seen in FIG. 4, the additional cooling channel 10 arranged in the radially outer end section 56b is arranged in the radially outer subspace 59b, which is formed by way of the phase insulation 58 formed by the plastic 11, of the intermediate space 9 or of the stator groove 54. In a manner similar to the first protective coating 75, the second protective coating 75 may also radially inwardly and radially outwardly delimit the second cooling channel 10 in the cross section perpendicular to the axial direction A. The second protective coating 75 may likewise surround and thereby delimit the second cooling channel 10 in the circumferential direction U of the stator 2 in the cross section perpendicular to the axial direction A.

Figure 5:
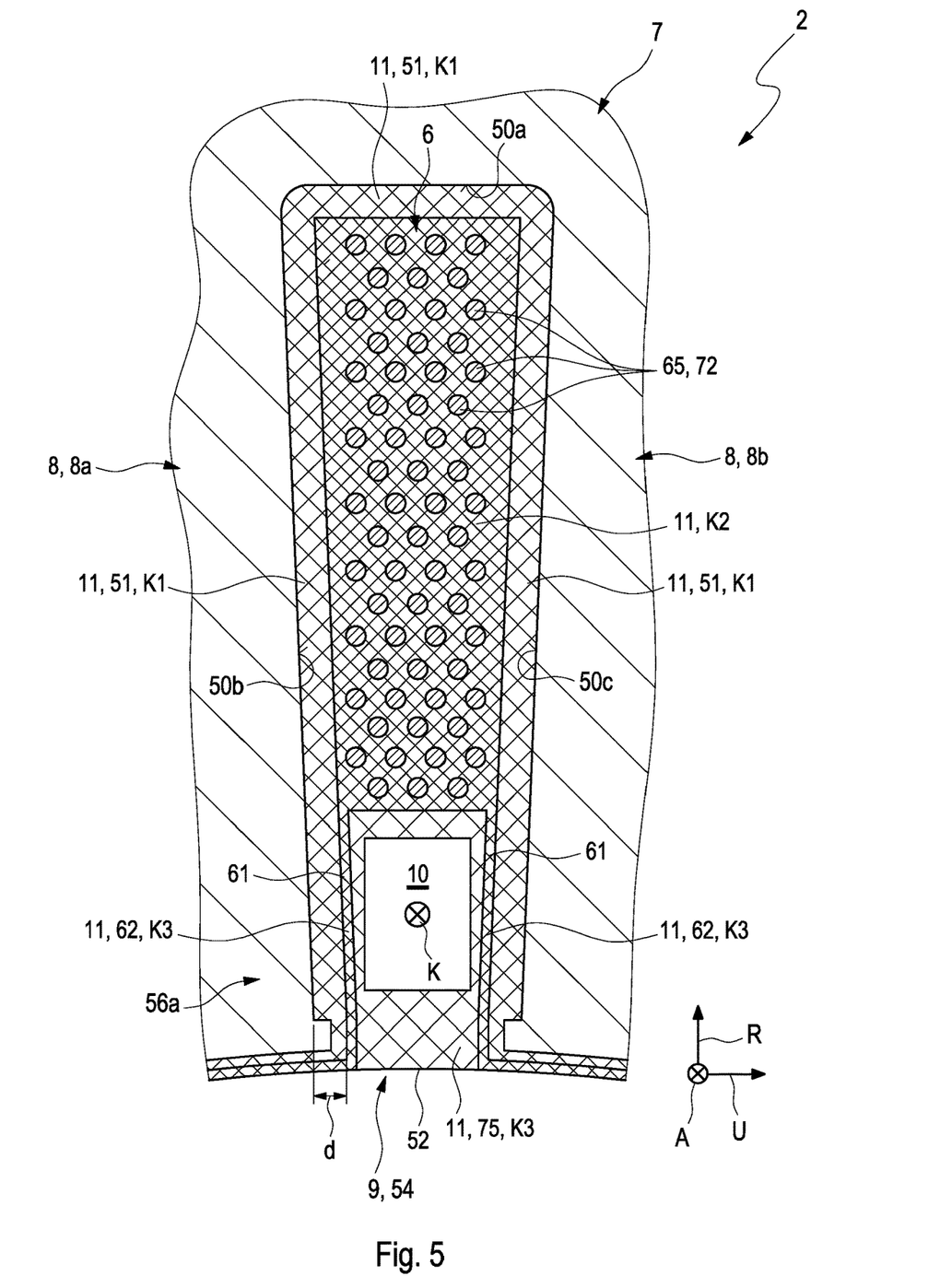
FIG. 5 shows a variant of the example according to FIG. 3, in which the stator windings are formed not by winding rods but rather by winding wires formed into a plastic mass.

FIG. 5 shows a variant of the example of FIG. 3. In the example of FIG. 5, the plastic forms a plastic mass into which the stator winding 6 is embedded. In the example of FIG. 5, the conductor elements 65 of the stator winding 6 are formed by winding wires 72 that are part of a distributed winding.

The plastic 11 provided on the surface sections 50a, 50b, 50c of the stator teeth 8a, 8b may be formed by a preferably electrically insulating first plastic material K1. The plastic 11 forming the phase insulation 58 may be formed by a second plastic material K2. The plastic 11 forming the first and second protective coating 75 may be formed by the second plastic material K2 or by a third plastic material K3 that is different therefrom. The second plastic material K2 is expediently designed to be electrically insulating or electrically conductive. The third plastic material K3 may also be designed to be either electrically insulating or electrically conductive. The first plastic material K1 may be a thermoplastic or a thermoset. The same applies to the second and the third plastic material K2, K3. In each case two or even all three plastic materials K1, K2, K3 may have identical thermal conductivities. As an alternative thereto, the first and, as an alternative or in addition, the second and, as an alternative or in addition, the third plastic material K1, K2, K3 may have different thermal conductivities. The first and, as an alternative or in addition, the second and, as an alternative or in addition, the third plastic material K1, K2, K3 may be identical materials. As an alternative thereto, the first and, as an alternative or in addition, the second and, as an alternative or in addition, the third plastic material K1, K2, K3 may be different materials.

The thermal conductivity of the plastic 11, in particular of the first and, as an alternative or in addition, of the second and, as an alternative or in addition, of the third plastic material K1, K2, K3 is likewise expediently at least 0.5 W/mK, preferably at least 1 W/mK.

Reference is made again below to FIG. 1. According to FIG. 1, the stator 2 with the stator body 7 and the stator teeth 8 is furthermore arranged axially between a first and a second end shield 25a, 25b.

As is able to be seen in FIG. 1, part of the coolant distribution space 4 is arranged in the first end shield 25a and part of the coolant collection space 5 is arranged in the second end shield 25b. The coolant distribution space 4 and the coolant collection space 5 are thus in each case partly formed by a cavity 41a, 41b provided in the plastic 11. The first cavity 41a is supplemented in this case by a cavity 42a formed in the first end shield 25a so as to form the coolant distribution space 4. Accordingly, the second cavity 41b is supplemented by a cavity 42b formed in the second end shield 25b so as to form the coolant collection space 5. In the variant embodiment explained above, the plastic 11 thus at least partly delimits the coolant distribution space 4 and the coolant collection space 5.

A coolant supply 35 may furthermore be formed in the first end shield 25a, which coolant supply fluidically connects the coolant distribution space 4 to a coolant inlet 33 that is provided externally, in particular circumferentially as illustrated in FIG. 1, on the first end shield 25a. A coolant drain 36 may accordingly be formed in the second end shield 25b, which coolant drain fluidically connects the coolant collection space 5 to a coolant outlet 34 that is provided externally, in particular circumferentially as illustrated in FIG. 1, on the end shield 25b. This allows an arrangement of the coolant distribution space 4 or of the coolant collection space 5 in each case radially externally on the first or second end section 14a, 14b of the stator winding 6 in question and also in the extension of these end sections 14a, 14b along the axial direction A. The end sections 14a, 14b of the stator windings 6, which end sections are thermally loaded to a particularly great extent during operation of the machine 1, are also cooled particularly effectively by way of this measure.

According to FIG. 1, the plastic 11 may also be arranged on an outer circumferential side 30 of the stator body 7 and thus form a plastic coating 11.1 on the outer circumferential side 30. The stator body 7, which is typically formed from electrically conductive stator plates, of the stator 2 is thus able to be electrically insulated from the surroundings. It is thus not necessary to provide a separate housing for receiving the stator body 7.

The invention claimed is:

1. An electrical machine comprising:
a rotor that is rotatable about an axis of rotation, by way of which an axial direction of the electrical machine is defined, and a stator that has electrically conductive stator windings; and
at least one cooling channel through which a coolant is flowable for cooling the stator windings;
wherein the stator has stator teeth that extend along the axial direction, are arranged spaced apart from one another along a circumferential direction of the rotor, and bear the stator windings;
wherein the at least one cooling channel and at least one stator winding are arranged in at least one intermediate space that is formed between two stator teeth adjacent to each other in the circumferential direction;
wherein a first plastic for transferring heat from the at least one stator winding to the at least one cooling channel is arranged on surface sections of the two adjacent stator teeth delimiting the intermediate space;
wherein a second plastic forms at least one phase insulation arranged in the intermediate space and that divides the intermediate space into a radially inner subspace and a radially outer subspace and forms filler portions;
wherein a third plastic surrounds an entire perimeter of the at least one cooling channel in a cross section perpendicular to the axial direction and is in contact with at least one of the first plastic and the second plastic;
wherein the at least one phase insulation formed by the second plastic is arranged between a plurality of first conductor elements of the stator winding disposed in the radially inner subspace and a plurality of second conductor elements of the stator winding disposed in the radially outer subspace;
wherein the filler portions of the second plastic are disposed between each of adjacent first conductor elements of the plurality of first conductor elements and each of adjacent second conductor elements of the plurality of second conductor elements;
wherein the intermediate space including the radially inner subspace and the radially outer subspace is provided substantially without gaps via the second plastic so as to be free from air pockets; and
wherein the at least one phase insulation has a radial thickness greater than that of the filler portions.

2. The electrical machine according to claim 1, wherein:
the stator comprises a stator body from which the stator teeth protrude radially inwardly; and
the first plastic is arranged on a surface section of the stator body that radially outwardly delimits the intermediate space.

3. The electrical machine according to claim 1, wherein the first plastic is arranged on surface sections of at least one of (i) the two adjacent stator teeth and (ii) a stator body from which the stator teeth protrude radially inward, to form an electrically insulating layer that covers the surface sections.

4. The electrical machine according to claim 1, wherein the at least one cooling channel is arranged in a region of a radially inner end section or a radially outer end section of the intermediate space.

5. The electrical machine according to claim 1, wherein the at least one phase insulation formed by the second plastic is arranged in the intermediate space and that divides the intermediate space into the radially inner subspace and the radially outer subspace, such that first conductor elements of the stator winding that form a first phase winding are able to be arranged in the radially inner subspace, and second conductor elements of the stator winding that form a second phase winding that is electrically insulated from the first phase winding are able to be arranged in the radially outer subspace.

6. The electrical machine according to claim 5, wherein the at least one phase insulation extends along the circumferential direction and connects two insulating layers made from the first plastic and arranged on the adjacent stator teeth to one another.

7. The electrical machine according to claim 5, wherein:
the plurality of first conductor elements are arranged in the radially inner subspace and electrically connected to one another in order to connect to a common first phase of an electric current source; and
the plurality of second conductor elements are arranged in the radially outer subspace and electrically connected to one another in order to connect to a common second phase of the electric current source.

8. The electrical machine according to claim 7, wherein at least one of the plurality of first conductor elements and the plurality of second conductor elements are individually surrounded by the second plastic, which is electrically insulating and thermally conductive, in a cross section perpendicular to the axial direction.

9. The electrical machine according to claim 7, wherein at least one of the plurality of first conductor elements and the plurality of second conductor elements are formed as a winding rod made from an electrically conductive material.

10. The electrical machine according to claim 9, wherein:
at least one winding rod as a rectangular geometry with two narrow sides and with two wide sides in a cross section perpendicular to the axial direction.

11. The electrical machine according to claim 7, wherein the plurality of first conductor elements are electrically insulated from the plurality of second conductor elements by way of the at least one phase insulation.

12. The electrical machine according to claim 1, wherein at least one of the second plastic and the third plastic forms a protective coating arranged in the intermediate space and at least partly at least one of delimits and surrounds the at least one cooling channel in a cross section perpendicular to the axial direction.

13. The electrical machine according to claim 12, wherein the protective coating at least one of radially inwardly and radially outwardly delimits the at least one cooling channel in the cross section perpendicular to the axial direction.

14. The electrical machine according to claim 12, wherein the protective coating delimits the at least one cooling channel in a circumferential direction of the stator in the cross section perpendicular to the axial direction.

15. The electrical machine according to claim 1, wherein an additional cooling channel is arranged in a region of a radially outer end section or of a radially inner end section of the intermediate space.

16. The electrical machine according to claim 15, wherein the third plastic forms a further protective coating arranged in the intermediate space and surrounds an entire perimeter of the additional cooling channel in the cross section perpendicular to the axial direction.

17. The electrical machine according to claim 16, wherein the further protective coating at least one of radially inwardly and radially outwardly delimits the additional cooling channel in the cross section perpendicular to the axial direction.

18. The electrical machine according to claim 16, wherein the further protective coating at least one of delimits and surrounds the additional cooling channel in the circumferential direction of the stator in the cross section perpendicular to the axial direction.

19. The electrical machine according to claim 1, wherein:
the first plastic provided on surface sections of the stator teeth is formed by an electrically insulating first plastic material,
the second plastic is formed by a second plastic material; and
the third plastic at least partly at least one of delimits and surrounds the at least one cooling channel in a cross section perpendicular to the axial direction, is formed by the second plastic material or by a third plastic material.

20. The electrical machine according to claim 19, wherein at least one of:
the second plastic material is designed to be electrically insulating or electrically conductive; and
the third plastic material is designed to be electrically insulating or electrically conductive.

21. The electrical machine according to claim 19, wherein at least one of:
at least one of the first plastic material, the second plastic material, and the third plastic material is a thermoplastic; and
at least one of the first plastic material, the second plastic material, and the third plastic material is a thermoset.

22. The electrical machine according to claim 19, wherein at least one of:
at least two of the first plastic material, the second plastic material, and the third plastic material have identical thermal conductivities; and
at least two of the first plastic material, the second plastic material, and the third plastic material have different thermal conductivities.

23. The electrical machine according to claim 19, wherein at least one of:
at least two of the first plastic material, the second plastic material, and the third plastic material are identical materials; and
at least two of the first plastic material, the second plastic material, and the third plastic material are different materials.

24. The electrical machine according to claim 1, wherein the stator winding is part of a distributed winding.

25. The electrical machine according to claim 1, wherein a thermal conductivity of at least one of the first plastic, the second plastic, and the third plastic is at least 0.5 W/mK.

26. The electrical machine according to claim 1, wherein the radial thickness of the at least one phase insulation is constant in the circumferential direction and between 1 mm and 3 mm.

* * * * *